US007699506B2

(12) United States Patent
Andersen et al.

(10) Patent No.: US 7,699,506 B2

(45) Date of Patent: Apr. 20, 2010

(54) SILENT MOVING HEAD PROJECTOR

(75) Inventors: Mads Holm Andersen, Skoedstrup (DK); Morten Groenberg, Skoedstrup (DK)

(73) Assignee: Martin Professional A/S, Aarhus N (DK)

( * ) Notice: Subject to any disclaimer, the term of this patent is extended or adjusted under 35 U.S.C. 154(b) by 38 days.

(21) Appl. No.: 11/835,564

(22) Filed: Aug. 8, 2007

(65) Prior Publication Data

US 2008/0062692 A1 Mar. 13, 2008

(30) Foreign Application Priority Data

Sep. 8, 2006 (DK) ............................... 2006 01158
Mar. 1, 2007 (DK) ............................... 2007 00310

(51) Int. Cl.
*B60Q 1/06* (2006.01)

(52) U.S. Cl. ....................... 362/373; 362/294; 362/345; 362/233; 362/547; 362/584

(58) Field of Classification Search ................. 362/294, 362/373, 345, 233, 547, 275, 293, 281, 284, 362/283

See application file for complete search history.

(56) References Cited

U.S. PATENT DOCUMENTS

| | | | | |
|---|---|---|---|---|
| 3,555,264 | A * | 1/1971 | Schimmelpfennig | 362/284 |
| 5,402,326 | A | 3/1995 | Belliveau | |
| 5,515,254 | A | 5/1996 | Smith et al. | |
| 5,791,755 | A | 8/1998 | Henry et al. | |
| 6,113,252 | A | 9/2000 | Arlitt et al. | |
| 6,863,421 | B2 | 3/2005 | Gulliksen | |
| 7,144,134 | B2 * | 12/2006 | Romano et al. | 362/293 |
| 2002/0003704 | A1 * | 1/2002 | Ohmae et al. | 362/293 |

FOREIGN PATENT DOCUMENTS

| | | | |
|---|---|---|---|
| EP | 1 001 212 | A2 | 5/2000 |
| WO | 01/84043 | A1 | 11/2001 |
| WO | 2005/095853 | A1 | 10/2005 |

* cited by examiner

*Primary Examiner*—Sandra L O'Shea
*Assistant Examiner*—Jessica L McMillan
(74) *Attorney, Agent, or Firm*—David S. Safran; Roberts Mlotkowski Safran & Cole, P.C.

(57) ABSTRACT

Moving head projector comprising a base, to which base a yoke is rotationally connected, to which yoke a head is rotationally connected, the head having a light source partly inside a reflector that forms a light beam which passes through a light forming arrangement located on at least one rotating disc formed member that is rotated by at least a first motor, and at least one lens through which the light beam passes before leaving the projector. The light forming arrangement is exchangeable via an opening in the head of the projector located radially outward of the at least one rotating disc formed member for providing direct access thereto during operation of the projector, the projector having a cover for closing and exposing said opening, opening of the cover switching the projector from a first mode of operation to a second mode of operation.

15 Claims, 8 Drawing Sheets

SILENT MOVING HEAD PROJECTOR

FIELD OF THE INVENTION

The present invention relates to moving head projector comprising a base, to which base a yoke is rotationally connected, to which yoke a head is rotationally connected, which head comprises a light source placed partly inside reflective means, which reflective means forms a light beam, which light beam passes through light forming means, which light forming means are placed on at least one disc formed member, which disc formed members are rotated by at lest a first motor means, which light forming means are exchangeable, where the light beam furthermore passes through at least one lens before the light beam leaves the projector.

The present invention relates further to a method for cooling a moving head projector which moving head projector comprises a base, to which base a yoke is rotationally connected, to which yoke the head is rotationally connected, which head comprises a light source placed partly inside reflective means, which reflective means forms a light beam, which light beam passes through light forming means, where the light beam furthermore passes through at least one lens before the light beam leaves the projector, where movement of or in the projector is performed by at least 3 step motors, which step motors are controlled by electronic circuits placed internal in the projector, where the power consumption of the moving head projector exceeds 150 W in normal operation.

BACKGROUND OF THE INVENTION

U.S. Pat. No. 5,515,254 concerns an automated colour mixing wash luminaire including a movable yoke and a housing movably connected to the yoke. The housing has a first portion including a light source and provides for removing heat generated from the light source. A second portion of the housing includes movable colour filters and a power lens. The light source is operable to project a beam of light along a path through the colour filters and the lens. Heat removal is provided by cooling fins and at least one heat filter supported in the path of the beam so that a portion of the beam passes through the heat filter and a portion of the beam is reflected from the path toward the cooling fins. The power lens is formed by a disc of cast transparent material including several lens elements in a honeycomb pattern. Each lens element has a convex surface. At least one of the colour filters is a gradient density colour filter formed of a disc-shaped substrate having a planar surface including a photolithographically etched film deposited thereon. The film forms a Gausian pattern arcuate band extending around a substantial portion of the planar surface. The band has inner and outer edges and the density of the film is greater in an area along a radius between the inner and outer edges and less along the radius at the inner and outer edges.

WO 2005/095853 relates to a light source module comprising a light source, which light source module comprises cooling means for cooling the light source base, which light source module further comprises a dichroic reflector, where at least one heat sink surrounds the dichroic reflector. The object of the present invention is to reduce the temperature at the lamp base to increase the lifetime of a lamp. This can be achieved by a light source module that comprises at least a first heat sink, which first heat sink comprises a number of dishes, which dishes are formed to achieve air gaps there between, which dishes comprises at least one opening for the dichroic reflector, which dishes are placed radially around the dichroic reflector, which air gaps between the dishes are directed mostly perpendicularly to a centre axis of the light source module. Hereby, it is achieved that most of the infrared light, which is radiated in the direction of the dichroic reflector is absorbed in the dishes of the heat sink, and because the direction of the dishes is perpendicular to the main axis of the lamp module, the dishes conduct the heat radially towards the outer surface of the dishes.

OBJECT OF THE INVENTION

It is the object of the invention to exchange light forming means in an easy and effective way, without necessarily disassemble or disconnect the projector to the power supply.

A further object of the invention is to achieve a primarily closed moving head projector, where air from the outside is prevented from entering the inner volumes of the projector. Furthermore, the object is to prevent the use of blowing means.

DESCRIPTION OF THE INVENTION

This is achieved by a projector as described in the preamble to claim 1 if modified so that the light forming means are exchanged from the outer side of the projector during operation of the projector, which projector comprises a cover, which cover by opening switches the projector from a first mode of operation to a second mode of operation.

In this way, it can be achieved that the exchange of light forming means can take place without dismounting the projector and transport it to a repair facility. The exchange of e.g. a gobo can by this invention take place exactly where the projector is in operation. Even if a projector hangs high over the floor of a stage near the ceiling, it should be possible when standing on a ladder to exchange all the gobos in the projector. Also other kinds of light forming means e.g. colour filters can be exchanged exactly in the same way. Also if a projector is in a repair station, it is much easier to exchange the light forming means in that only one colour has to be opened.

Activation of the cover can rotate the disc formed member into the next position. In a possible embodiment of the invention, a gobo holder can e.g. be rotated one step forwards or backwards depending on opening or closing of the cover. The system can operate in a way where closing and opening the cover rotates one step clockwise, but if the person exchanging e.g. the gobos wants a reverse rotation the cover can be closed and opened two times. In this situation, the rotation could be anticlockwise. In this way, it is possible to exchange all the gobos placed on a gobo holder and also to exchange all colour forming means placed on another rotating wheel in a projector.

In the second mode of operation all feed back activities from moving components are stopped in the projector. By closing all feed back operations in the mode which is activated by opening the cover, the projector can in the pan and tilt motors be fixed in the actual position. In this way, it is possible to move the projector into an optimal position before the cover is opened. This position will then be fixed as long as the exchange of gobo or colour filters take place.

Activation of the head by moving either the pan or tilt motors rotates the dish formed member into the next position. An alternative way of changing the position of one of the moving dishes could be that in an open position of the cover moving of the head in one direction of the pan or tilt motors can generate a signal that is used for rotating e.g. the gobo holder and depending on whether the movement is right or left, the rotation can be clockwise or anticlockwise of the rotating dishes.

It is preferred that the projector switches back from the second mode of operation automatically after a first defined time period without any detected activity. Hereby it can be achieved that the projector automatically switches into normal operation if somebody forgets to close the cover.

Cooling of all optical and electrical components in the moving head projector can take place by means of natural heat convection and heat radiation.

Thus, the moving head projector can operate without active cooling means e.g. without blowing means. This automatically leads to a very low projector noise level. In practise it means that the projector is absolutely silent during operation. Hence, not a sound is to be heard, it is only during movement of mechanical components inside the projector that noise is generated. Since no openings are necessary in the outer contour of the projector, the projector prevents air from entering the inner volumes of the projector. This is very important as the ambient air often is polluted and might contain not only dust but also droplets of oil leaving a layer of dirt on all components, which results in that the components have to be cleaned. Especially on the outside of the light source and the reflector a layer consisting of dust and oil film reduces the light output. As a consequence the light source and the reflector need service at regular intervals. By preventing air from entering the projector through air inlets, pollution inside the projector is avoided.

The head can comprise a dichroic reflector, which reflector is placed inside a closed cavity, which cavity is formed in a cooling component, which component comprises axial outwardly directed cooling fins. The use of the dichroic reflector leads to efficient reflection of visible light. However, infrared light penetrates the dichroic reflector and is absorbed by the inner surface of the cavity. This heats up the inside of the cavity, however as the cavity is formed of a heat conductive material the heat is conducted into the cooling fins immediately. This prevents the temperature from rising inside the cavity, as there is balance between the produced heat and the temperature in the cavity, when the temperature reaches a certain level.

An open space is preferably formed between the cavity and the reflector. This way an isolating space is formed between the reflector and the inner wall of the cavity.

The cavity can have inwardly directed cooling fins. Due to the inwardly directed cooling fins the reflector is placed at a distance to form a cooling volume between the reflector and the cavity surface. These inwardly directed cooling fins lead to cooling of the air inside the cavity. These cooling fins lead to a large volume inside the cavity and to efficient air cooling of this volume. This air cooling also reduces the temperature inside the cavity.

The cavity and at least one optical component form a primarily closed volume, which volume comprises the light source and the reflector. By forming a primarily closed volume, no dust or other kind of pollution reach the cavity. This prevents built-up of oil film and dust on the light source itself and on the reflector. Hence, there is no need for service inside the cavity. The only service which needs to be made is to replace the light source at very long time intervals.

The base is preferably formed with a first and a second housing for electronic components, where a third closed housing can be formed between the first and the second housing, which third housing can comprise cooling fins on the outside, where the first, second and third housing form a primarily closed volume. The formation of a base in different separated housings leads to that the normal electronic components, which produce limited heat can be placed in the two outer houses, where most heat producing components are placed in the middle. It is preferred that the outer houses are produced of plastic components, where the third house in the middle are produced of metal or another heat conductive material. This can lead to efficient cooling of transformers and of the circuit necessary to power the light source. By placing the heat producing components in the middle they do not transmit heat into the two outer housings, where the normal electronics are placed. This can lead to a highly efficient base for a moving head projector.

Heat producing components can be placed in the third volume, which heat producing power components are placed on the outer wall of the third housing. Placing the heat producing components on the outer walls automatically leads to more efficient cooling of these components.

The yoke is preferably formed with cooling fins on the outside, where the inner of the yoke forms a primarily closed volume. Forming the yoke as a closed unit reduces the pollution inside the yoke.

BRIEF DESCRIPTION OF THE DRAWINGS

FIG. 1 shows a fully assembled moving head projector 2 comprising a base for a yoke 6 and a head 8.

The yoke 6 is rotationally fastened to the base 4, where the head 8 is rotationally fastened to the yoke 6. This allows the head 8 to move in all directions.

Figure 1:
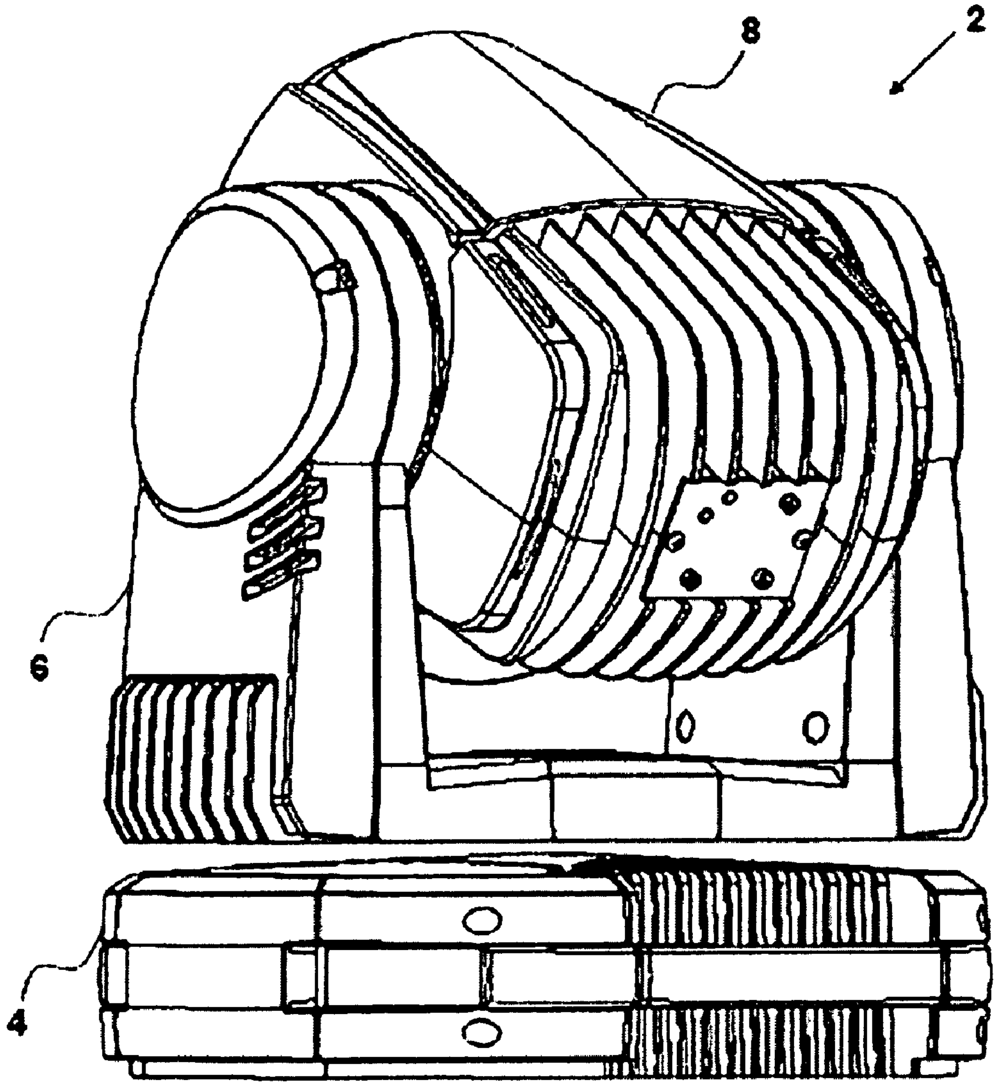
FIG. 1 shows a fully assembled moving head projector.
Figure 2:
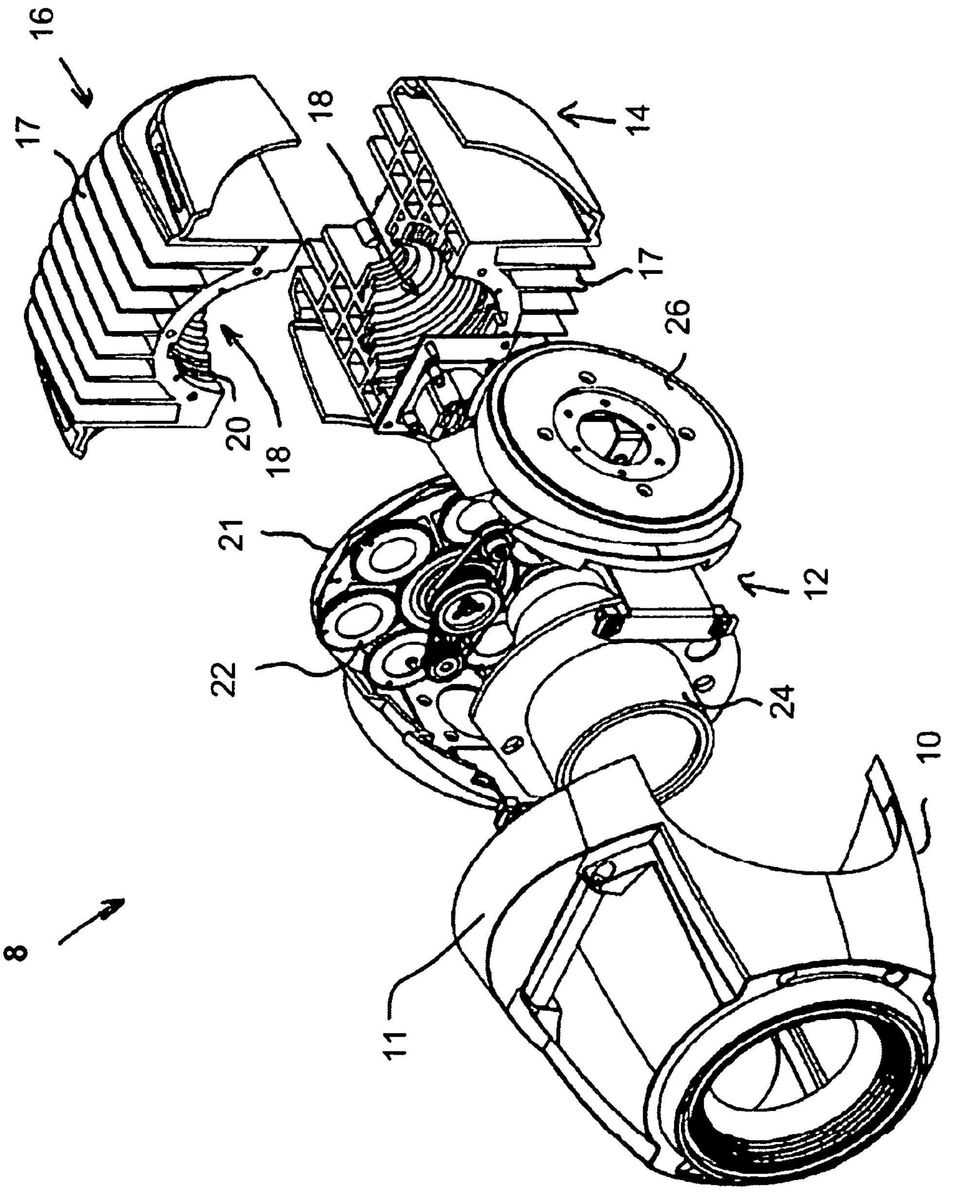
FIG. 2 shows an exploded view of a head.

FIG. 2 shows an exploded view of a head 8. A front cover 10 is moved forward to open into a light forming apparatus 12, the front cover contain a top cover 11, which top cover is shown in a closed position. At the back of the head 8 is shown a first half part 14 and a second half part 16 of housing for a light source. Inside the two half parts 14 and 16 a cavity 18 is indicated. This cavity 18 is formed with inwardly directed cooling fins 20. The light forming apparatus 12 contains light forming means 22 rotational fixed towards and a rotating disc 21. Furthermore, an optical system 24 is shown, which system can comprise one or more lenses.

The cavity 18 can contain a reflector and a light source placed inside the reflector, where an open space is formed between the outside of the reflector and the cooling fins 20. The reflector can be a dichroic reflector, which reflects the visible light; however infrared light passes through the reflector. This way the infrared light is absorbed inside the cavity 18. Furthermore, the air in the cavity 18 is heated during operation of a light source. On the outside of the housing for the light source 14, 16 cooling fins 17 are formed, which cooling fins 17 are orientated in axial direction in relation to the axis of light. This direction of the cooling fins 17 is efficient regardless of the direction of the head 8, as the air circulation between the cooling fins 17 always is efficient regardless of the orientation of the head. The efficient cooling of the outside of the housing for the light source 14, 16 reduces the temperature in the cavity 18 into a temperature level, which is acceptable for a light source. This cooling is so efficient that there is no need for forced air cooling. This way the cavity 18 can be formed as a closed volume. By closing this volume it is avoided that dust or any other kind of contamination reach the cavity, and no deposition of dust or oil film can take place inside the light source or the reflector. This leads to very limited maintenance of the light source and the reflector.

Figure 3:
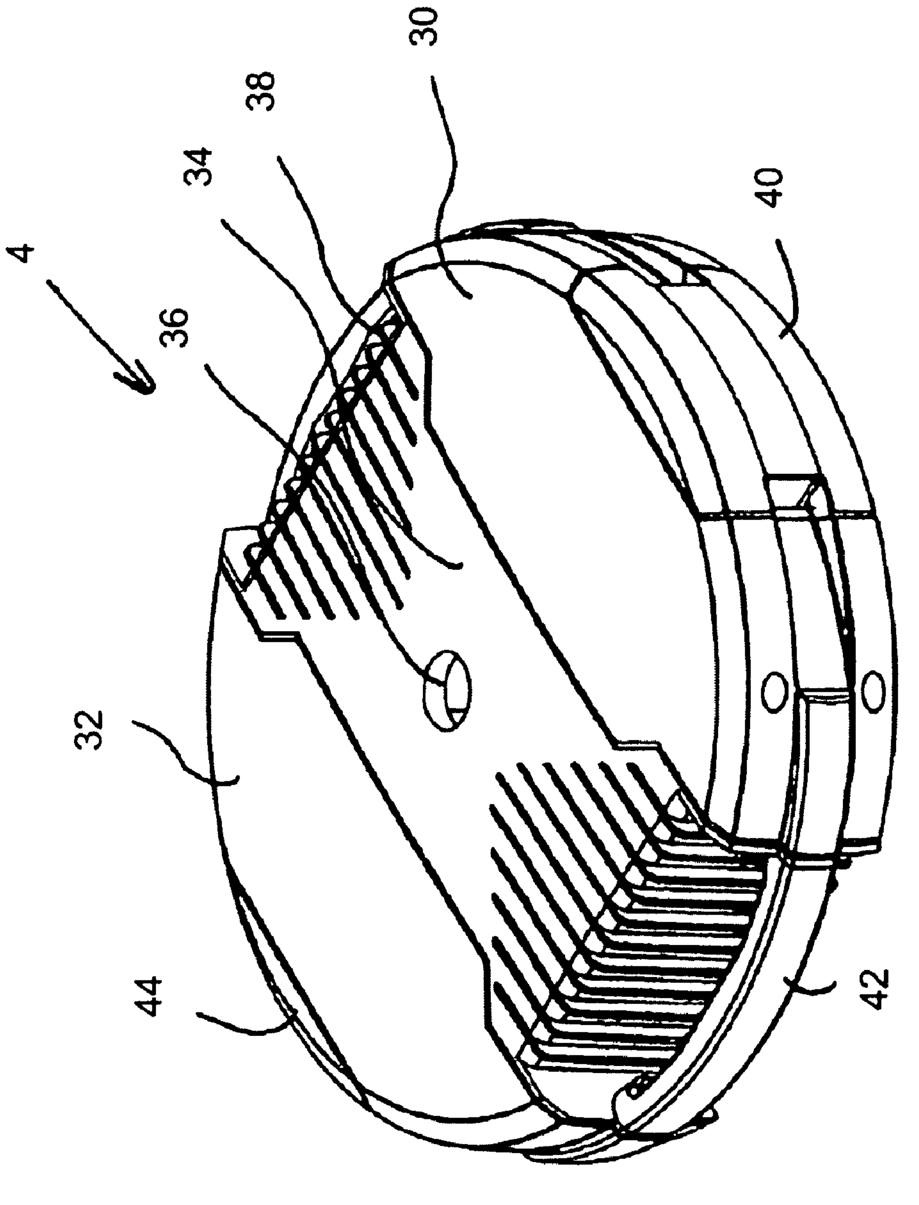
FIG. 3 shows a base.

FIG. 3 shows a base 4, which base comprises a first housing 30 a second housing 32 and a third housing 34. A hole 36 in the housing 34 is necessary to connect the yoke 6. The third housing 34 has cooling means 38 at the end. A cover 40 covers electronic connections. Furthermore, a cover 44 is indicated, which cover allows access into e.g. a display means.

Figure 4:
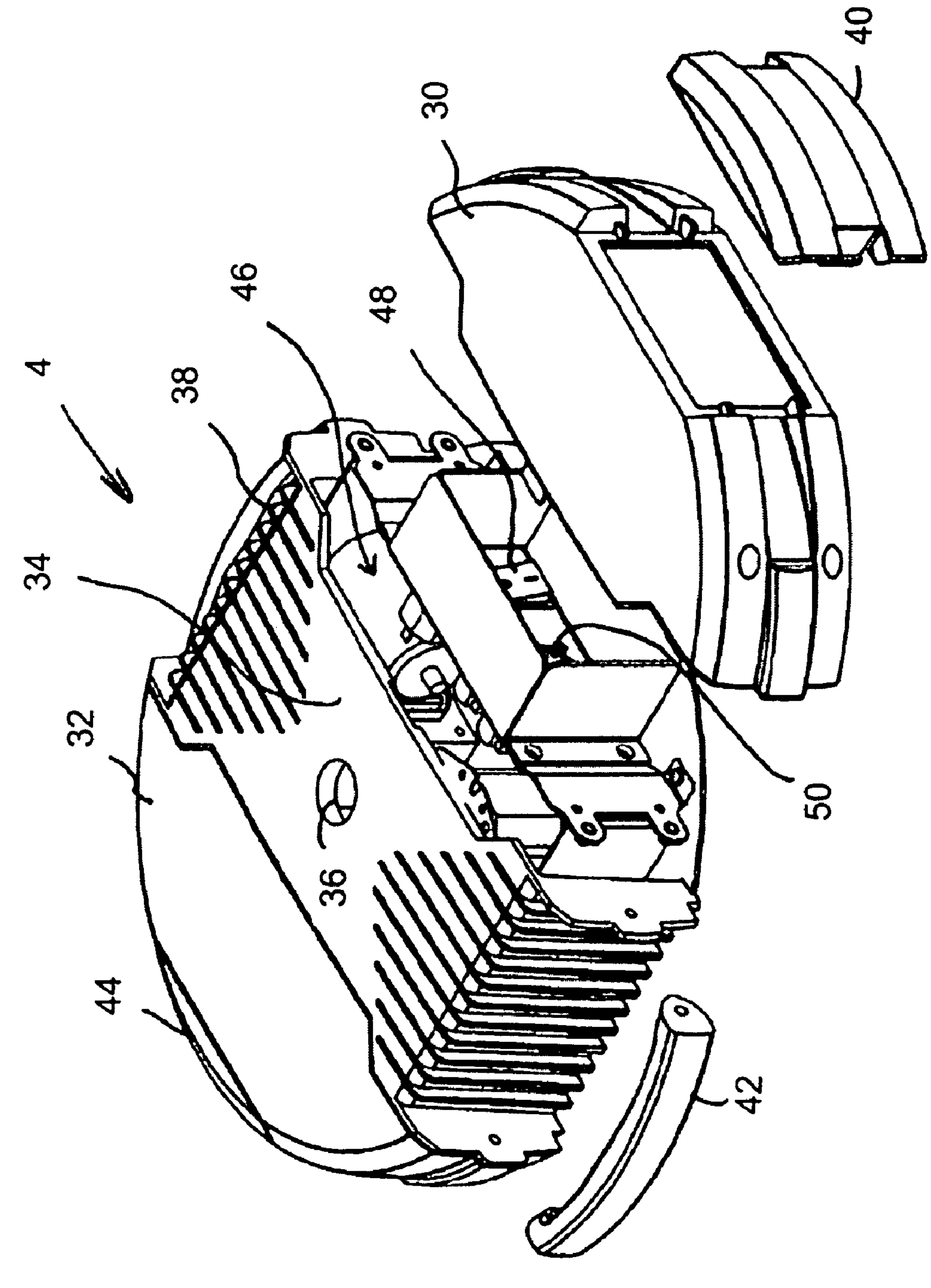
FIG. 4 shows an exploded view of a base

FIG. 4 shows an exploded view of a base 4. The component numbers used in FIG. 3 are used, and there will be no mentioning of the already mentioned components. Number 46 indicates the inner of the first housing 30, where different electronic components are seen. On the outside a switch 48 and a data connection 50 are seen. This way a base 4 can be formed, which base 4 has two housings 30 and 32, which housings 30 and 32 contain electronic components. The third housing 34 contains power consuming components in the shape of transformers and starting means for a light source. As most of the heat is generated in the housing 34 this heat is conducted by the housing 34 into cooling fins 36 formed at both ends of the base 4. Preferably housing 34 is formed of an efficient heat conductive material. One possible material is aluminium.

Figure 5:
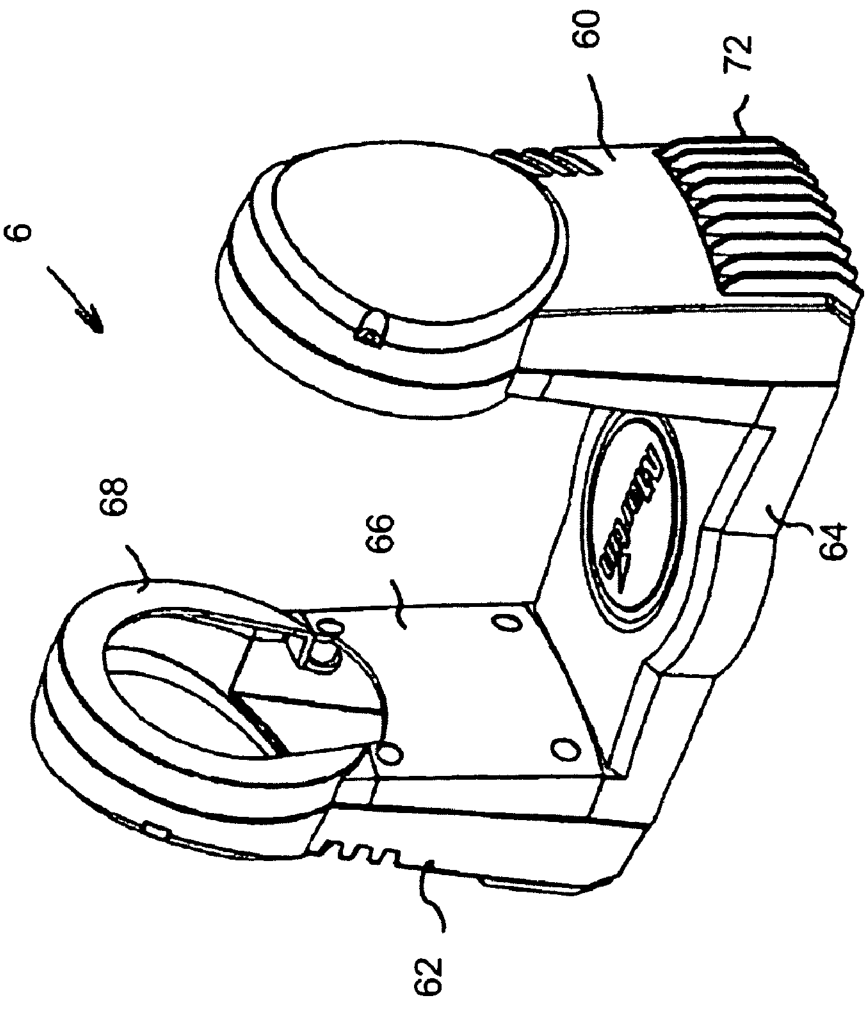
FIG. 5 shows a yoke

FIG. 5 shows a yoke 6, which contains a first arm 60 and a second arm 62, which are connected by a mid-section 64. An inner shield 66 is seen, and a shield 68 is indicated. The mid-section is at the end formed with cooling fins 72.

Figure 6:
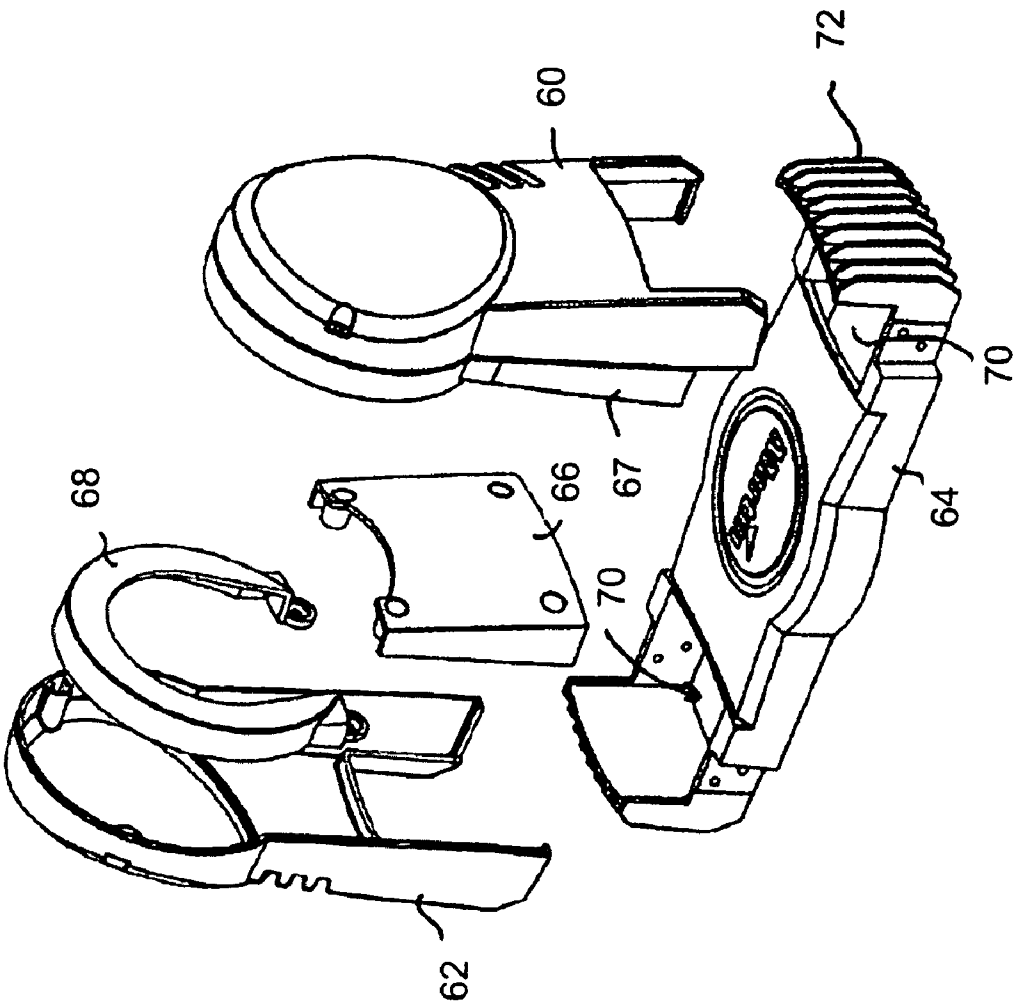
FIG. 6 shows the same components, with that the arms along with the mid-section.

FIG. 6 shows the same components, which are not further mentioned. From FIG. 6 it appears that the arms 60 and 62 along with the mid-section 64 form an open space 70, which can be used as housing for a motor to tilt the head 8. Furthermore, a motor for rotating the yoke 6 can be placed in the mid-section 64.

Figure 7:
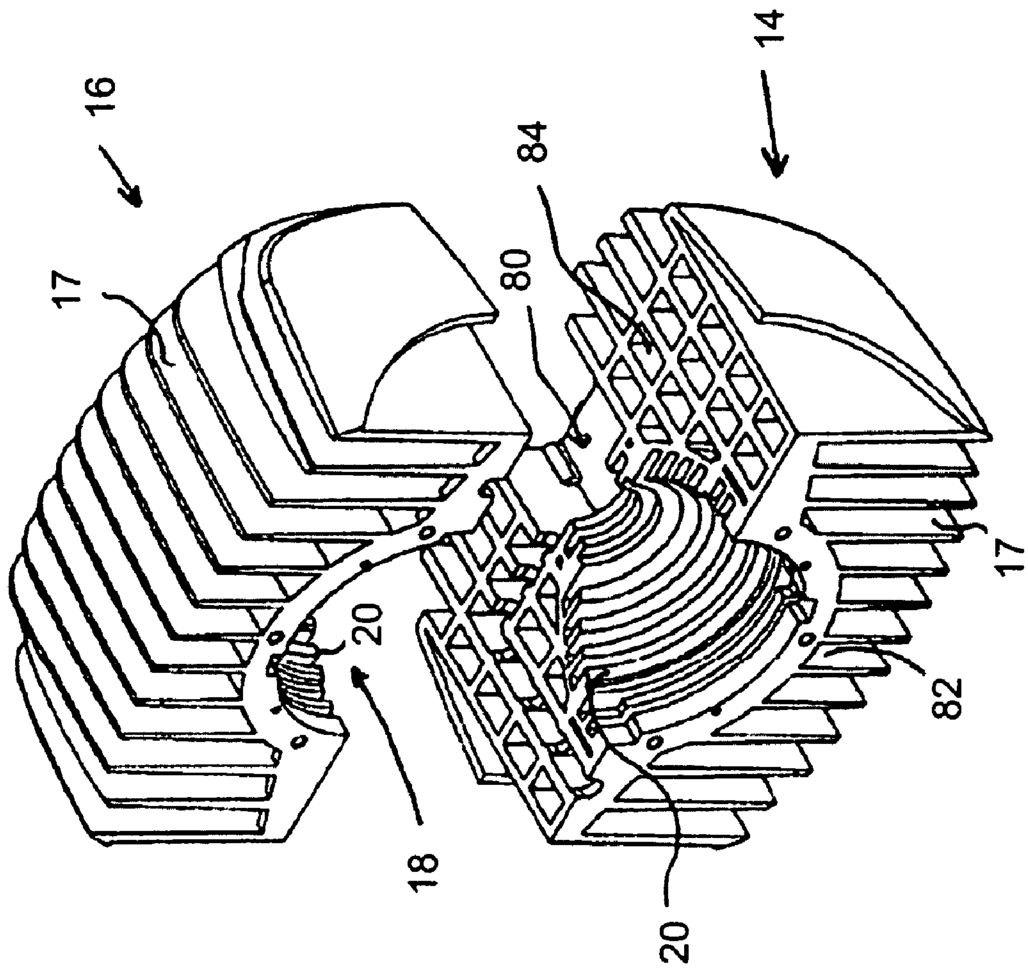
FIG. 7 shows an enlarged view of the first and second half part of the housing for the light source shown in FIG. 2.

FIG. 7 shows an enlarged view of the first half part 14 and of the second half part 16 of the housing for the light source shown in FIG. 2. FIG. 7 shows outwardly directed cooling fins 17. Inside the two half parts 14 and 16 a cavity 18 is seen. The inner walls of this cavity 18 are formed as inwardly directed cooling fins 20. Behind the cavity 18 an opening 80 is seen, which opening is to accommodate the light source and a light source base. Between the cooling fins 17 air gaps 82 are formed. Furthermore, openings 84 are seen, which openings are cellular formed simply to achieve mechanical support for the cooling fins 17.

In a moving head projector 2 as described there is no use of any active cooling means. This way it is achieved that the moving head projector 2 is silent during operation, as no mechanical parts are moved. This is a very interesting feature especially in connection with moving head projectors used in e.g. theatres, shops or in connection with exhibitions.

Figure 8:
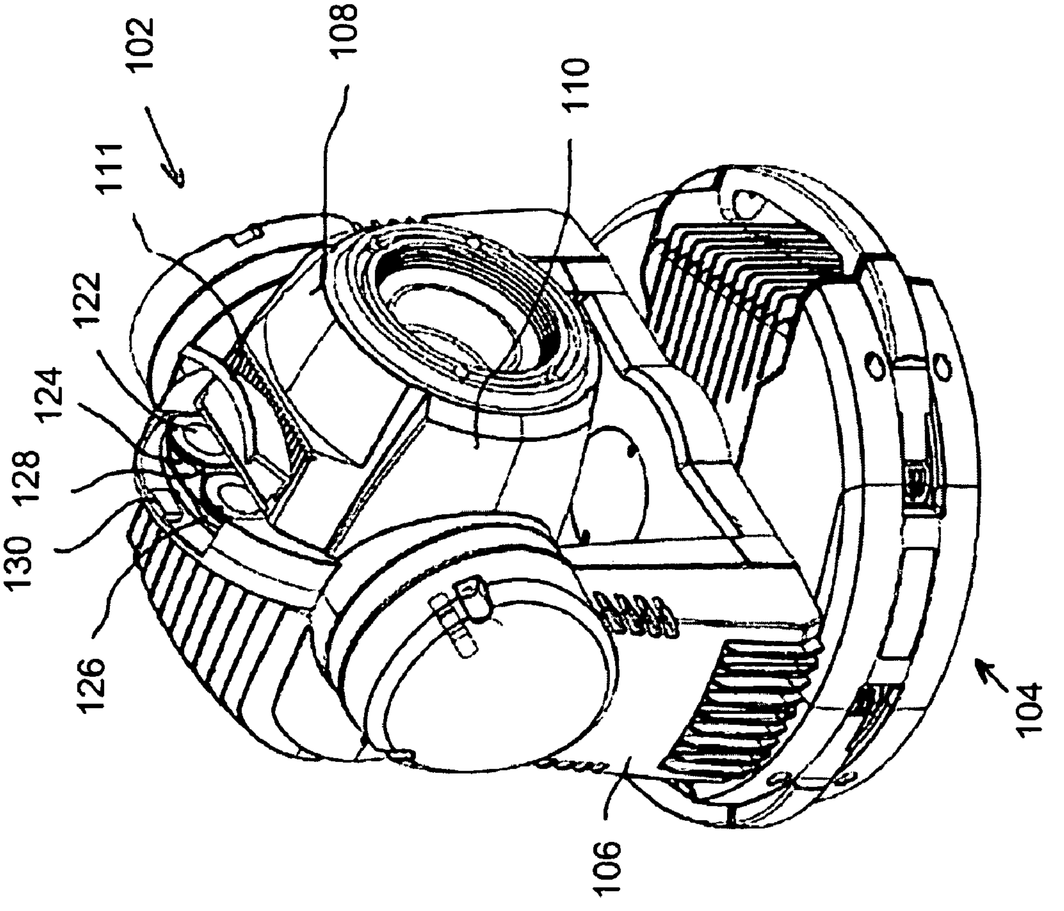
FIG. 8 shows a side view of the invention with a cover in an opens position.

FIG. 8 shows a side view of the invention with a cover in an open position. The projector 102 is placed on a base 104 by a yoke 106. The projector head 108 has a front cover 110 to which front cover 110 a further cover 111 is shown in an open position. Under the cover 111 a number of optical components are seen. At first, a gobo holder assembly 122 is seen which gobo holder assembly 122 has a toothed outer side which is used for rotating the gobo holder assembly 122. The gobo holder assembly 122 is placed on a dish shaped gobo wheel 124 which also can be rotated. The gobo holder assembly 122 is fixed to the gobo wheel 124 by spring means 128. Behind the gobo wheel 124 a further dish 126 is shown which dish 126 is a holder for colour filters which also are exchangeable. The dish 126 can also be rotated for exchanging colour filters. A switch 130 will be activated by closing or opening the cover 111.

In operation, the projector 102 will switch from a first normal operational mode into a second mode of operation if the cover 111 is opened. This change of mode is performed by activation of the switch 130. In this second mode of operation there is access to the gobo holder assembly's 122 and also to colour filters placed on the rotating disc 126. The gobo wheel 124 and also the dish 126 can both be rotated. In one example, this rotation takes place each time the cover 111 is closed and reopened. A double activation could rotate in the opposite direction. Another possibility for rotating the discs is to move the head, e.g. in the direction in which the rotation is wanted, will force both of the rotating discs to rotate in that direction as long as you press on the head. This way of operation could be extremely helpful if exchange of gobos has to take place high over a stage floor standing on a ladder. Other forms of rotating the gobo wheel 124 and disc 126 is of course also possible, e.g. by external commands which could come from a computer connected to the projector or from a remote control communicating with the projector.

What is claimed is:

1. Moving head projector comprising a base (4, 104), to which base (4, 104) a yoke (6, 106) is rotationally connected, to which yoke (6, 106) a head (8, 108) is rotationally connected, which head (8, 108) comprises a light source placed partly inside reflective means, which reflective means forms a light beam, which light beam passes through light forming means, which light forming means (22, 122) are placed on at least one rotating disc formed member (21, 124, 126), which rotating disc formed members (21, 22, 122, 124, 126) are rotated by at least first motor means, which light forming means (22, 122) are exchangeable, where the light beam furthermore passes through at least one lens (24) before the light beam leaves the projector, characterized in that the light forming means (22, 122) are exchangeable via an opening in the head of the projector (2, 102) located radially outward of the rotating disc formed members for providing direct access thereto during operation of the projector (2, 102), which projector (2, 102) comprises a cover (111) for closing and exposing said opening, which cover (111) by opening switches the projector (2, 102) from a first mode of operation to a second mode of operation.

2. Moving head projector according to claim 1, characterized in that activation of the cover (111) rotates the disc formed members (21, 124, 126) into the next position.

3. Moving head projector according to claim 1, characterized in that in the second mode of operation is all feed back activities from moving components (4, 6, 104, 106) stopped in the projector (2, 102).

4. Moving head projector according to claim 3, characterized in that activation of the head by moving either the pan or tilt motors rotates the disc formed member (21, 124, 126) into the next position.

5. Moving head projector according to claim 1, characterized in that the projector (2, 102) switches back from the second mode of operation automatically after a first defined time period without any detected activity.

6. Moving head projector according to claim 1, wherein said first mode is a normal operating mode and said second mode is a fixed mode in which the position of the projector fixed.

7. Moving head projector according to claim 6, wherein said second mode is adapted to automatically switch back to said first mode after a defined time period in the absence of detected activity with the cover in open.

8. Moving head projector according to claim 6, wherein at least one of opening and closing of the cover produces indexing of the rotating disc formed members.

9. Method for cooling a moving head projector (2, 102) which moving head projector (2, 102) comprises a base, to which base (4, 104) a yoke (6, 106) is rotationally connected, to which yoke (6, 106) a head (8, 108) is rotationally connected, which head (8, 108) comprises a light source placed partly inside reflective means, which reflective means forms a light beam, which light beam passes through light forming means (12), where the light beam furthermore passes through at least one lens (24) before the light beam leaves the projector (2, 102), where movement of or in the projector (2, 102) is performed by at least 3 step motors, which step motors are controlled by electronic circuits placed internal in the projector, where the power consumption of the moving head projector (2, 102) exceed 150 W in normal operation, characterized in that cooling of all optical and electrical components in the moving head projector (2, 102) is performed by natural heat convection and heat radiation, the base (4, 104) is formed with a first and a second housing (30, 32) for electronic components, where a third closed housing (34) is formed between the first (30) and the second housing (32), which third housing comprises (34) cooling fins (38) on the outside, where the first (30), second (32) and third housing (34) form a primarily closed volume.

10. Method for cooling moving head projector according to claim 9 characterized in that the head (8, 108) comprises a dichroic reflector, which reflector is placed inside a closed cavity (18), which cavity is formed in a cooling component (14, 16), which component (14, 16) comprises axial outwardly directed cooling fins (17).

11. Method for cooling moving head projector according to claim 10, characterized in that the cavity (18) has inwardly directed cooling fins (20).

12. Method for cooling moving head projector according to claim 10, characterized in that the cavity (18) and at least one optical component form a primarily closed volume, which volume comprises the light source and the reflector.

13. Method for cooling moving head projector according to claim 9, characterized in that an open space is formed between the inner wall of the cavity (18) and the reflector.

14. Method for cooling moving head projector according to claim 9 characterized in that heat producing components are placed in the third volume, which heat producing power components are placed on the outer wall of the third housing (34).

15. Method for cooling a moving head projector (2, 102) which moving head projector (2, 102) comprises a base, to which base (4, 104) a yoke (6, 106) is rotationally connected, to which yoke (6, 106) a head (8, 108) is rotationally connected, which head (8, 108) comprises a light source placed partly inside reflective means, which reflective means forms a light beam, which light beam passes through light forming means (12), where the light beam furthermore passes through at least one lens (24) before the light beam leaves the projector (2, 102), where movement of or in the projector (2, 102) is performed by at least 3 step motors, which step motors are controlled by electronic circuits placed internal in the projector, where the power consumption of the moving head projector (2, 102) exceed 150 W in normal operation, characterized in that cooling of all optical and electrical components in the moving head projector (2, 102) is performed by natural heat convection and heat radiation, and the yoke (6, 106) is formed with cooling fins (72) on the outside, where the inner of the yoke (6, 106) forms a primarily closed volume.

* * * * *